(12) United States Patent
Mtauweg et al.

(10) Patent No.: US 11,346,326 B2
(45) Date of Patent: May 31, 2022

(54) WIND TURBINE HAVING A MULTI-STAGE MAGNETIC TRANSMISSION

(71) Applicant: Wobben Properties GmbH, Aurich (DE)

(72) Inventors: Samer Mtauweg, Bremerhaven (DE); Falko Bürkner, Bremen (DE); Johannes Brombach, Berlin (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/978,510

(22) PCT Filed: Mar. 6, 2019

(86) PCT No.: PCT/EP2019/055551
§ 371 (c)(1),
(2) Date: Sep. 4, 2020

(87) PCT Pub. No.: WO2019/170733
PCT Pub. Date: Sep. 12, 2019

(65) Prior Publication Data
US 2020/0400126 A1 Dec. 24, 2020

(30) Foreign Application Priority Data
Mar. 8, 2018 (DE) ............ 10 2018 105 404.1

(51) Int. Cl.
*F03D 15/00* (2016.01)
*F03D 80/70* (2016.01)
*F03D 9/25* (2016.01)
*H02K 7/18* (2006.01)

(52) U.S. Cl.
CPC ............ *F03D 15/00* (2016.05); *F03D 80/70* (2016.05); *F03D 9/25* (2016.05); *F05B 2220/706* (2013.01); *F05B 2240/50* (2013.01); *F05B 2260/404* (2013.01); *F05B 2260/40311* (2013.01); *H02K 7/1838* (2013.01)

(58) Field of Classification Search
CPC ...... F03D 15/00; F03D 9/25; F05B 2220/706; F05B 2260/40311; F05B 2260/404; H02K 7/1838; Y02E 10/72
USPC ............................ 290/44, 55
See application file for complete search history.

(56) References Cited

U.S. PATENT DOCUMENTS 8,067,847 B1 * 11/2011 Waszak ............ F03D 9/25
290/44
8,288,910 B1 * 10/2012 Van Neste ............ H02K 31/00
310/178
9,593,753 B2 * 3/2017 Davey .................. H02K 49/102
(Continued)

FOREIGN PATENT DOCUMENTS

| DE | 3246122 A1 | 6/1984 |
|---|---|---|
| DE | 102015221894 A1 | 5/2017 |
| DE | 102016216458 A1 | 3/2018 |

*Primary Examiner* — Charles Reid, Jr.
*Assistant Examiner* — Charles H Reid
(74) *Attorney, Agent, or Firm* — Seed Intellectual Property Law Group LLP

(57) ABSTRACT

A wind turbine including a rotor blade hub, a generator, and a magnetic transmission which is connected at the drive side to the rotor blade hub and at the driven side to the generator. The magnetic transmission is in the form of a multi-stage, in particular two-stage, magnetic transmission.

18 Claims, 5 Drawing Sheets

(56) References Cited

U.S. PATENT DOCUMENTS

| | | |
|---|---|---|
| 2009/0001731 A1* | 1/2009 | Perlo .................. F16C 39/063 |
| | | 290/55 |
| 2010/0052323 A1* | 3/2010 | Vyas .................... H02K 16/04 |
| | | 290/44 |
| 2011/0042965 A1 | 2/2011 | Atallah et al. |
| 2013/0207391 A1* | 8/2013 | Hemmelmann .......... H02P 9/40 |
| | | 290/44 |
| 2014/0284932 A1 | 9/2014 | Sharkh et al. |
| 2018/0034356 A1 | 2/2018 | Urch |
| 2018/0313426 A1 | 11/2018 | Dieckhoff et al. |
| 2019/0195193 A1 | 6/2019 | Brenner et al. |

\* cited by examiner

WIND TURBINE HAVING A MULTI-STAGE MAGNETIC TRANSMISSION

BACKGROUND

Technical Field

The invention concerns a wind turbine comprising a rotor blade hub, a generator and a magnetic transmission which is connected at the drive side to the rotor blade hub and at the driven side to the generator.

Description of the Related Art

On the German application from which priority is claimed the German Patent and Trade Mark Office searched the following documents: DE 3246122 A1, DE 102015221894 A1, DE 102016216458 A1, US 2011/0042965 A1 and US 2014/0284932 A1.

Such wind turbines having a magnetic transmission are known from the state of the art. In such wind turbines for some types of generator, it is desirable for the rotor speed and thus the hub speed to be transformed by means of a gear to higher rotary drive speeds for a generator. The generator can then be smaller, lighter and thus less expensive in construction.

It is further known from the state of the art, for transforming the hub speed, not to use a conventional gear transmission but a single-stage magnetic transmission. In such magnetic transmissions transmission of force from the drive side of the gear to the driven side is effected in contact-less fashion. Apart from possible bearing wear, that results in very substantial freedom from wear of such a gear. Transmission of force is accordingly effected virtually without any loss and thus with a high level of efficiency. In addition in the event of a possible overload such a magnetic transmission merely goes into a slip state, with damage due to the overload being effectively prevented in comparison with a mechanical transmission.

In the single-stage magnetic transmissions known from the state of the art for use in wind turbines however there is the issue that the maximum transmission ratio of such a single-stage gear is subject to limits. Accordingly the maximum output rotary speed of such a gear that is to be achieved at a maximum with a given rotor and thus drive speed is limited. Accordingly by virtue of the lower operating speeds, the generators typically have to be of larger dimensions and thus involve a greater generator mass. It is thus difficult to achieve a high level of cost efficiency in the gear-generator arrangement.

BRIEF SUMMARY

Provided is a wind turbine which has a transmission which involves as little wear and as little maintenance as possible and which further permits higher drive output rotary speeds and higher cost efficiency in respect of a gear-generator arrangement.

The magnetic transmission is in the form of a multi-stage, in particular two-stage, magnetic transmission. The magnetic transmission is preferably connected to the generator non-rotatably at the driven side, that is to say either rigidly or by means of an elastic coupling.

In comparison with a single-stage magnetic transmission, a multi-stage magnetic transmission allows higher transmission ratios and at the same time is still of compact external dimensions. The generator of a wind turbine can thus be operated at higher rotary drive speeds. The consequence of this is that the generators can be lighter and more compact in design without that entailing adverse consequences in regard to the efficiency of the wind turbine. The proposed multi-stage magnetic transmission is very substantially wear-free, low in maintenance and reliable. In addition there is effective protection from overload, which could lead to damage of the transmission in the case of a mechanical multi-stage gear transmission.

In this case the magnetic transmission is preferably in the form of a two-stage magnetic transmission. Designing the gear in the form of a two-stage gear has proven to be a good compromise in regard to sufficient flexibility in relation to the transmission ratio to be implemented by the gear, and mechanical complexity.

The first gear stage of the magnetic transmission has a ring gear, a modulator and a sun gear. According to a preferred embodiment, the first gear stage of the magnetic transmission is in the form of a stationary gear wherein the ring gear is mounted rotatably and connected to the rotor blade hub and the modulator is stationary. In that arrangement the ring gear of the first gear stage is connected to the drive—therefore to the rotor blade hub.

According to an alternative embodiment the first gear stage of the magnetic transmission is in the form of a planetary gear wherein the ring gear is stationary and the modulator is designed to be mounted rotatably and is connected to the rotor blade hub. In this embodiment the rotor blade hub is non-rotatably connected to the modulator, with the ring gear being stationary.

The sun gear is mounted rotatably. In other words in that case in the first gear stage the rotary speed produced at the drive side by the rotor blade hub is converted into a higher rotary speed, that higher rotary speed being applied to the sun gear of the first gear stage. Preferably the sun gear is mounted rotatably, irrespective of whether the first gear stage of the magnetic transmission is in the form of a stationary gear or a planetary gear. The sun gear therefore represents the driven side of the first gear stage.

Further preferably the second gear stage of the magnetic transmission has a ring gear and a modulator. According to an alternative embodiment the second gear stage of the magnetic transmission is in the form of a stationary gear wherein the ring gear is mounted rotatably and is connected to the sun gear of the first gear stage and the modulator is stationary. In this embodiment the ring gear of the second gear stage is coupled at the drive side to the driven-side ring gear of the first gear stage.

In an alternative embodiment the first gear stage of the magnetic transmission is in the form of a planetary gear wherein the ring gear is stationary and the modulator is mounted rotatably and is connected to the sun gear of the first gear stage. In this embodiment the driven-side sun gear of the first gear stage is coupled to the drive side of the second gear stage in such a way that the sun gear of the first gear stage is non-rotatably connected to the modulator of the second gear stage.

The second gear stage of the magnetic transmission preferably has a sun gear. In that arrangement the sun gear forms the driven side of the second gear stage. Preferably in that case the sun gear involves a higher rotary speed than the ring gear or the modulator, the sun gear preferably being rotatably mounted. In other words the hub speed is converted by means of the two-stage magnetic transmission into a higher speed which finally applies to the driven-side sun gear of the second gear stage.

In a preferred embodiment the generator has a rotor and a stator, the rotor of the generator being connected to the sun gear of the second gear stage. In that case it is preferred that the transmission ratios of the first gear stage and the second gear stage are so matched that the generator can be designed to be as compact and light as possible, in dependence on the hub speed, with a level of efficiency comparable in comparison with the use of a single-stage transmission.

In an alternative embodiment the sun gear of the second gear stage of the magnetic transmission has a stator in the form of the generator stator. In other words, with such a construction the generator is structurally integrated at least partially into the second gear stage of the magnetic transmission. The second gear stage preferably has only at the drive side a rotatable ring gear or a rotatable modulator, wherein all other components are immobile relative to each other and relative to the axle journal or machine carrier. The second gear stage therefore no longer involves mechanical transmission from the drive side to the driven side but rather magnetic transmission. In the context of that magnetic transmission a rapidly circulating rotary field is generated, which induces an electric current in the generator stator.

The advantages of such a generator which is integrated into the second gear stage are of many different kinds and provide, for example, that the required structural space of such an arrangement is small and at the same time the mass of such a generator which is integrated into the magnetic transmission, in relation to the gear generator unit, is smaller than the masses of the corresponding individual components if they were combined in conventional fashion. In addition the number of rotating parts can be reduced by means of such an arrangement as only the ring gear is rotatably mounted on the part of the second gear stage. All other components are immobile relative to each other and relative to the axle journal or machine carrier and are therefore not subject to any wear, in particular even no bearing wear.

Further preferably the generator stator has a winding in the form of a homopolar rotary field winding. Such a winding or kind of winding has proven to be particularly advantageous in regard to the energy yield of such a generator or generator stator.

According to an alternative preferred embodiment the generator stator is arranged adjacent to the modulator of the second gear stage and/or the generator stator and the modulator are arranged in mutually coaxial relationship. In that case it is preferred that an air gap remains between the individual components.

In a preferred development the magnetic transmission and/or the generator is mounted by means of a main bearing or by means of two bearings to an axle journal. In that respect it is preferred for the main bearing to be in the form of a rolling bearing or plain bearing. The main bearing therefore carries the mass of the magnetic transmission and/or the generator or the magnetic transmission-generator combination. The axle journal can be of a one-part or multi-part structure.

In a preferred development the magnetic transmission is supported at the axle journal or the machine carrier by means of an elastic support. In that case the elastic support is preferably adapted to be adjustable and particularly preferably has at least one elastomer torque support means. In that way the gear torque can be supported and the reaction forces acting on the axle journal or the machine carrier can be reduced or damped. It is also possible to achieve acoustic advantages. Thus acoustic decoupling of the gear and the generator from the axle journal or the machine carrier results in a reduction in the noise emissions occurring upon operation of a wind turbine, and so-to-speak damping of the vibrations which occur in operation takes place.

In a further preferred embodiment the ring gear and/or the sun gear of the first and/or second gear stage have magnets. Preferably moreover the magnets are so arranged that in operation they constitute magnetic pole pairs. In a first embodiment at least some of the magnets are in the form of permanent magnets. In an alternative embodiment the magnets are in the form of separately excited magnets. The transmission ratio of the magnetic transmission stages in question can advantageously be influenced as desired by the configuration and number of the magnets.

It is further preferred that the ring gear, the sun gear and the modulator of the first and/or second gear stage are arranged in mutually coaxial relationship. Such a structure has proven to be particularly space-saving.

In a preferred development the number of magnetic pole pairs of the sun gear of the first stage is unequal to the number of magnetic pole pairs of the sun gear of the second stage and/or the number of the magnetic pole pairs of the sun gear of the first stage is not an integral multiple of the number of the magnetic pole pairs of the sun gear of the second stage. Preferably moreover the number of the magnetic pole pairs of the ring gear of the first stage is unequal to the number of magnetic pole pairs of the ring gear of the second stage and/or the number of the magnetic pole pairs of the ring gear of the first stage is not an integral multiple of the number of the magnetic pole pairs of the ring gear of the second stage. That prevents the occurrence of detent torques between the gear stages in question.

It is further preferred that the number of the magnetic pole pairs of the ring gear of the first and/or second stage is unequal to the number of the magnetic pole pairs of the sun gear of the first and/or second stage and/or the number of the magnetic pole pairs of the ring gear of the first and/or second stage is not an integral multiple of the number of the magnetic pole pairs of the sun gear of the first and/or second stage. That prevents the occurrence of detent torques within the gear stages in question.

In an alternative preferred embodiment an air gap or a magnetically non-conductive material is arranged between the modulator and the ring gear and/or the sun gear of the first and/or second gear stage. The efficiency of the magnetic transmission can be optimized by targeted dimensioning of the air gap or the magnetically non-conductive material.

The invention has been described hereinbefore with reference to a wind turbine. In a further aspect the invention concerns a magnetic transmission for a wind turbine. The magnetic transmission by the magnetic transmission is in the form of a multi-stage, in particular two-stage, magnetic transmission. The magnetic transmission also enjoys the same advantages and preferred configurations as the wind turbine. In that respect attention is directed to the foregoing description and the content thereof is hereby incorporated.

BRIEF DESCRIPTION OF THE SEVERAL VIEWS OF THE DRAWINGS

The invention is described in greater detail hereinafter by means of a preferred embodiment by way of example with reference to the accompanying Figures wherein.

DETAILED DESCRIPTION

Figure 1:
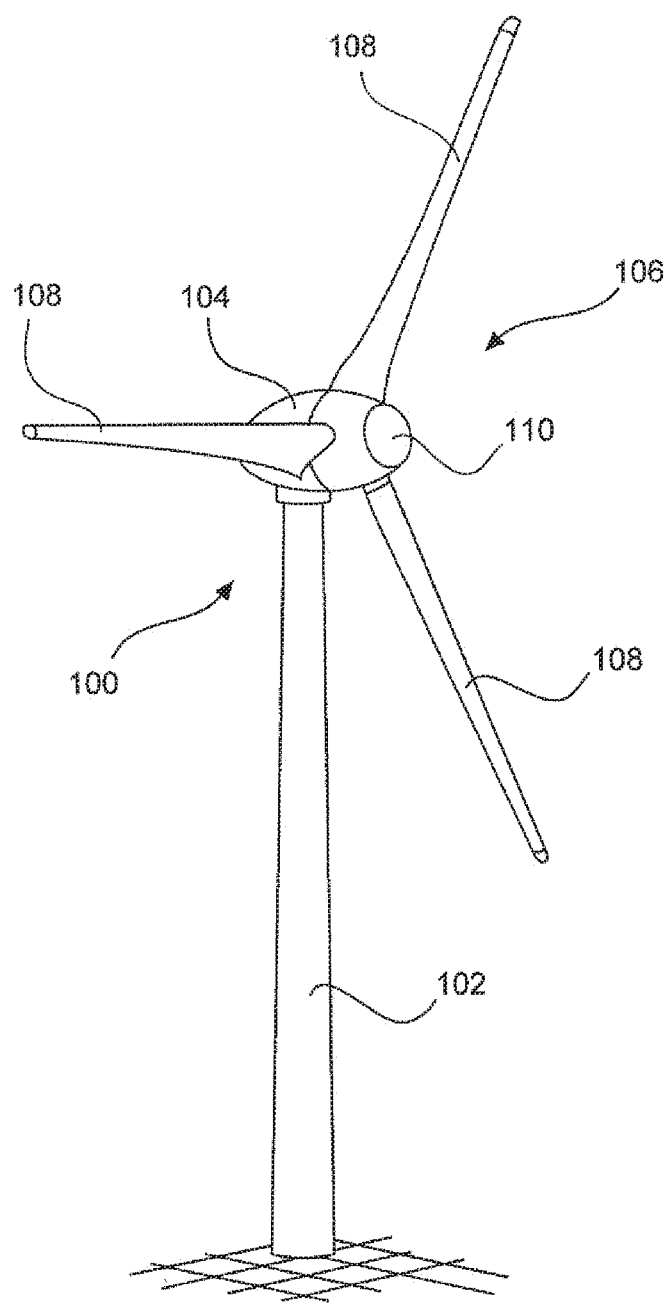
FIG. 1 shows a perspective view of a wind turbine according to the invention.

FIG. 1 shows a wind turbine 100 comprising a tower 102 and a nacelle 104. A rotor 106 is arranged on the nacelle 104. The rotor 106 has three rotor blades 108 connected to a spinner 110. The rotor 106 is driven in rotation by the wind in operation thereof and thereby drives a generator (see subsequent Figures) in the nacelle 104, converting the rotational energy of the rotor 106 into electric power.

Figure 2:
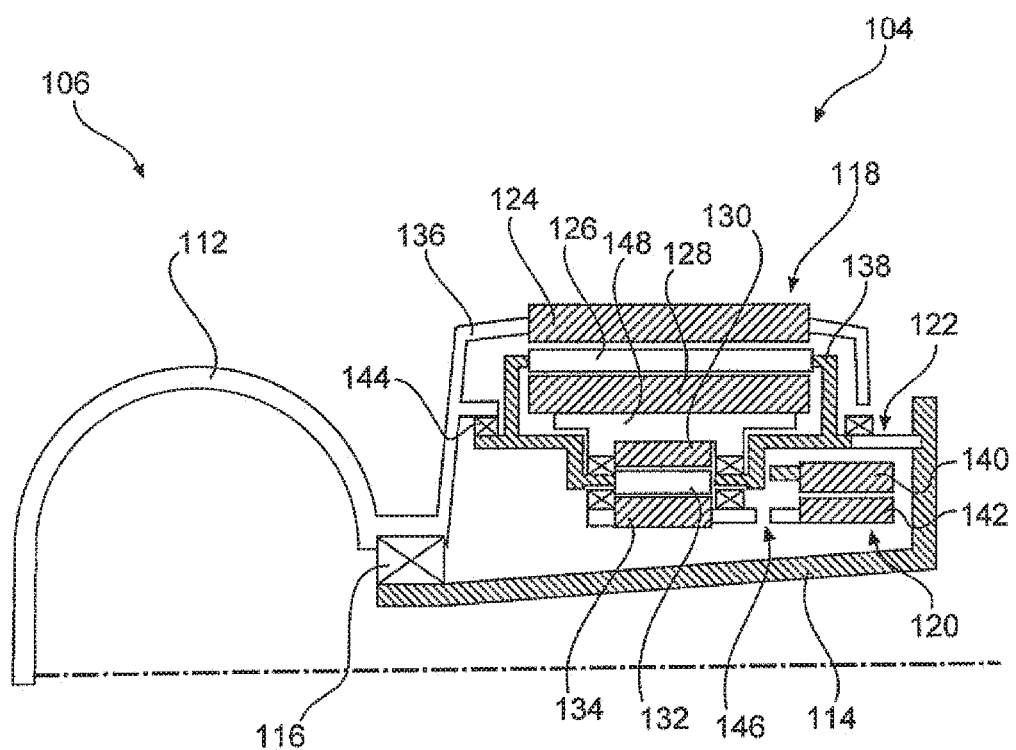
FIG. 2 shows a side view of the embodiment of the wind turbine shown in FIG. 1.

FIG. 2 shows a nacelle 104 having an axle journal 114 on which a rotor hub 112 is mounted by means of a main bearing arrangement 116. The rotor blade hub 112 is connected by way of a rotating gear leg 136 to a ring gear of a first gear stage 124 of a magnetic transmission 118. A modulator of the first gear stage 126 is arranged in coaxial and adjacent relationship with the ring gear of the first gear stage 124. In the present case the modulator 126 is arranged stationarily relative to the axle journal 114 by means of the stationary gear leg 138. Arranged adjacent to the modulator of the first gear stage 126 is the rotatably mounted sun gear of the first gear stage 128. The first gear stage is thus formed by the ring gear 124, the modulator 126 and the sun gear 128. In that arrangement a rotary speed transmission effect is achieved such that the sun gear of the first transmission stage 128 at the driven side rotates more rapidly than the drive-side ring gear 124.

The sun gear of the first gear stage 128 is connected to a ring gear of a second gear stage by means of a coupling portion 148. In other words the ring gear of the second transmission stage 130 is driven by means of the coupling portion 148 by the sun gear of the first gear stage. Arranged adjacent to the ring gear of the second gear stage 130 is a modulator of the second gear stage 132. It is arranged immovably relative to the axle journal 114 by means of the stationary gear leg 138.

Arranged adjoining the modulator of the second gear stage 132 is a sun gear of the second gear stage 134. That sun gear of the second gear stage 134 forms the driven side of the second gear stage and the magnetic transmission 118 overall. The sun gear of the second gear stage 134 is connected to a generator rotor 142 of a generator 120 by way of a generator shaft 146.

Besides the generator rotor 142 the generator 120 has a generator stator 140. The arrangement comprising the magnetic transmission 118 and the generator 120, besides the main bearing arrangement 116, is supported relative to the axle journal 114 by means of a support 112. Overall therefore the first gear stage is formed by the ring gear 124, the modulator 126 and the sun gear 128, in the form of a stationary gear.

The second gear stage with the ring gear 130, the modulator 132 and the sun gear 134 is also in the form of a stationary gear. Both the modulator of the first gear stage 126 and also the modulator of the second gear stage 132 are arranged immovably relative to each other and to the axle journal 114. An enlarged view of the magnetic transmission 118 is additionally shown in FIG. 3.

Figure 3:
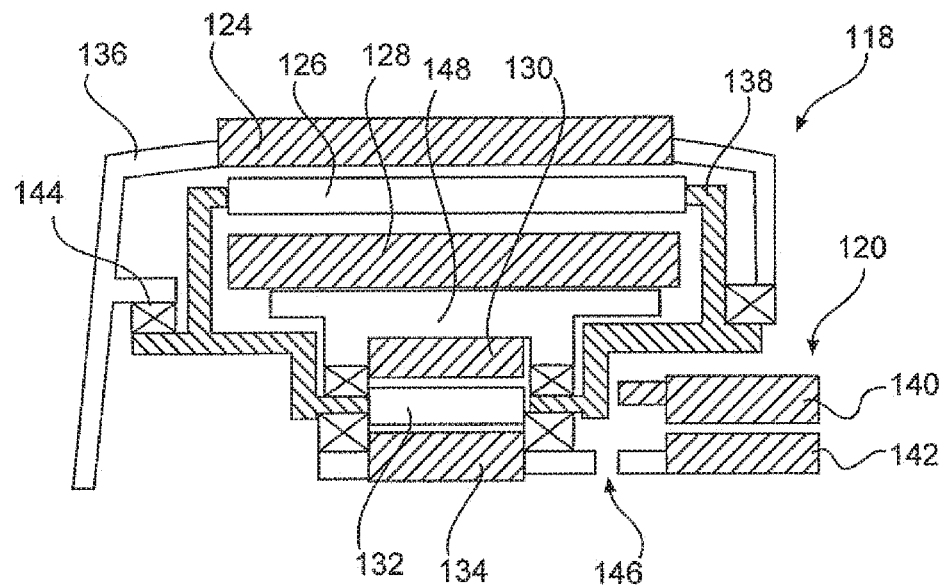
FIG. 3 shows a perspective view of the embodiment of a wind turbine shown in FIGS. 1 and 2.
Figure 4:
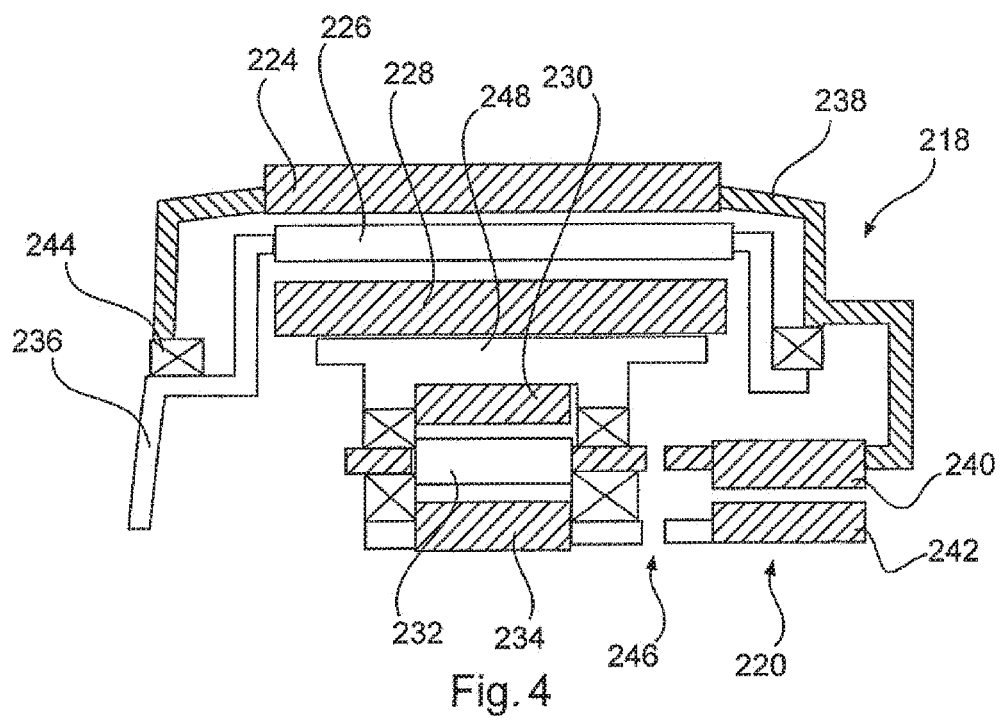
FIG. 4 shows a sectional view of a second embodiment of a wind turbine according to the invention.

FIG. 4 shows an alternative embodiment of a magnetic transmission 218. The magnetic transmission 218 has a first gear stage having a ring gear 224, a modulator 226 and a sun gear 228. Differing from the embodiment known from FIGS. 1 to 3 the first gear stage of the magnetic transmission 218 is in the form of a planetary gear wherein the ring gear of the first gear stage 224 is arranged immovably relative to the axle journal (not shown) and to the modulator 232 of the second gear stage, but the modulator 226 is rotatable. The sun gear of the first gear stage 228 is also mounted rotatably and connected by way of the coupling portion 248 to the ring gear of the second gear stage 230.

The second gear stage comprising the ring gear 230, the modulator 232 and the sun gear 234 is in the form of a stationary gear, as in the embodiment of FIGS. 1 to 3, wherein the modulator 232 is arranged immovably relative to the axle journal (not shown) and the ring gear of the first gear stage 224 and the ring gear 230 and the sun gear 234 are mounted rotatably. The sun gear of the second gear stage 234 is connected by way of the generator shaft 246 to the generator 220 and the generator rotor 242 respectively. The generator stator 240 is arranged immovably and stationarily.

Figure 5:
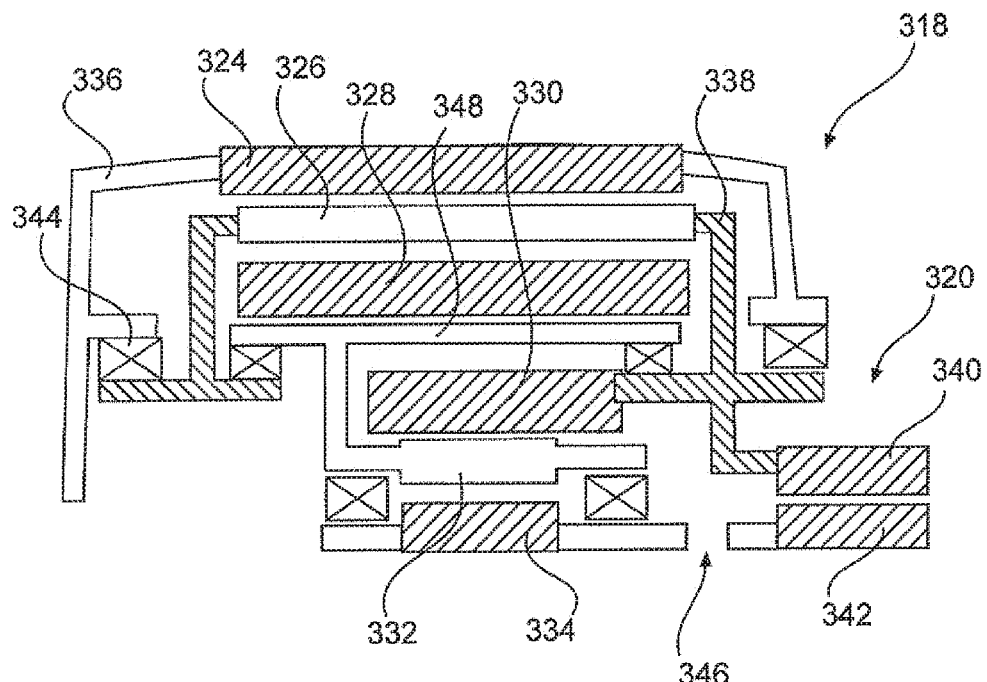
FIG. 5 shows a sectional view of a third embodiment of a wind turbine according to the invention.

A third alternative embodiment of a magnetic transmission 318 is shown in FIG. 5. In this case the first gear stage formed by the ring gear 324, the modulator 326 and the sun gear 328 is in the form of a stationary gear, similarly to the embodiment of FIGS. 1 to 3, wherein the modulator 326 is arranged immovably relative to the gear leg 338 and the axle journal (not shown) but the ring gear 324 and the sun gear 328 are rotatable.

The sun gear of the first gear stage 328 is now coupled to the modulator 232 of the second gear stage by means of the coupling portion 348. The ring gear of the second gear stage in contrast is arranged immovably relative to the axle journal (not shown) and to the modulator 326 of the first gear stage. The sun gear of the second gear stage 334 is arranged rotatably and connected to the rotor 342 of the generator 320 by way of the generator shaft 346.

Figure 6:
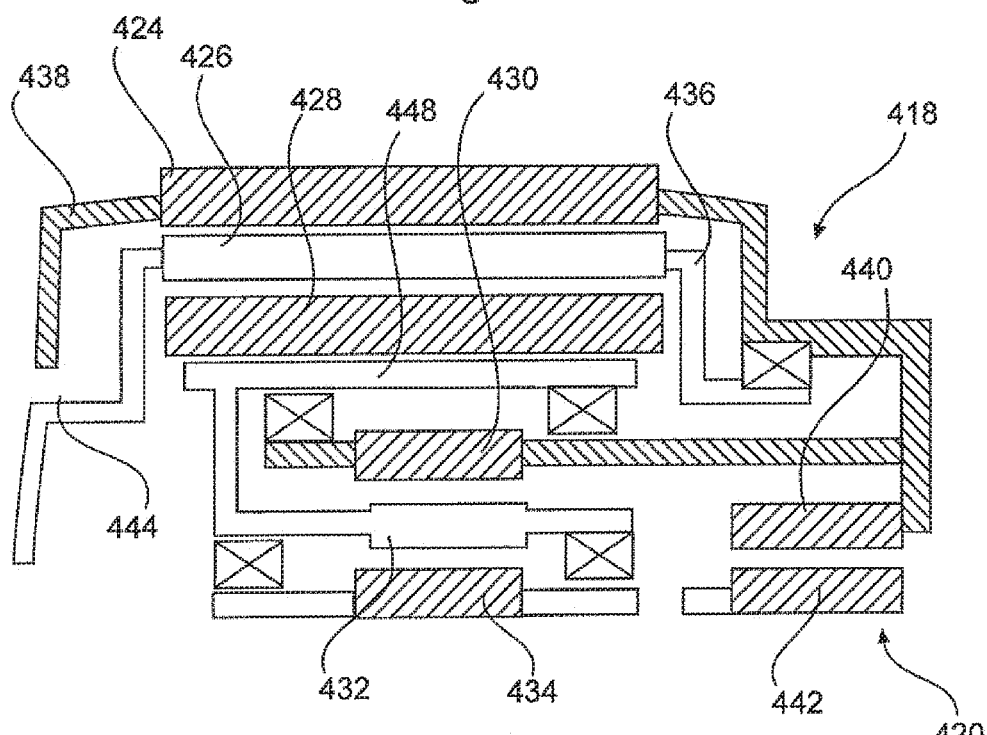
FIG. 6 shows a sectional view of a fourth embodiment of a wind turbine according to the invention.

A fourth alternative embodiment of a magnetic transmission 418 is shown in FIG. 6. In the FIG. 6 embodiment the modulator of the first gear stage 426 is rotatably mounted and driven. The ring gear of the first gear stage 424 in contrast is arranged immovably relative to the axle journal (not shown) and to the ring gear 430 of the second gear stage. The sun gear of the first gear stage 428 is mounted rotatably and connected to the modulator of the second gear stage 432 by means of the coupling portion 448. The ring gear of the second gear stage is arranged immovably relative to the ring gear 424 of the first gear stage. The sun gear of the second gear stage is mounted rotatably and connected to the rotor 442 of the generator 420.

Figure 7:
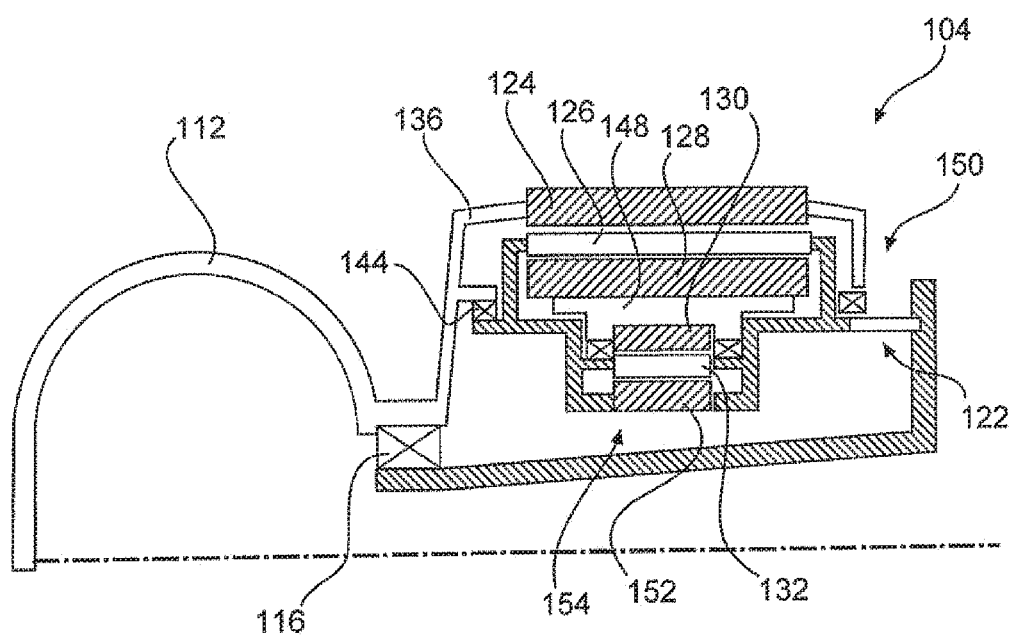
FIG. 7 shows the embodiment of a wind turbine according to the invention as shown in FIGS. 1 to 3 with a generator integrated into the second gear stage.

FIG. 7 shows a nacelle 104 as shown in FIG. 2, but here the original sun gear of the second gear stage has now been replaced by a generator stator 154. That generator stator 154 is immovable relative to the axle journal 114 and the modulator 126 of the first gear stage and has a stator winding 152. The second gear stage formed from the ring gear 130, the modulator 132 and the stator 152 therefore no longer provides a mechanical transmission ratio but magnetic transmission with the generation of a rapidly rotating rotary field which induces an electric current in the generator stator 154 or in the windings 152 thereof.

Figure 8:
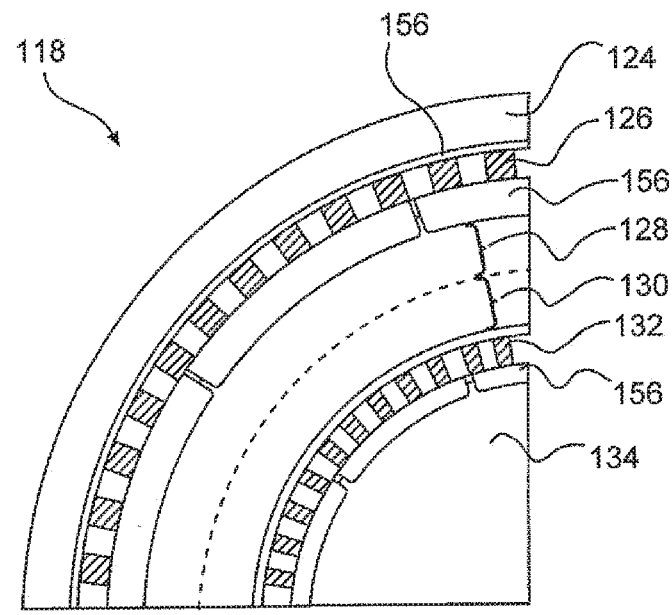
FIG. 8 shows a sectional view of a magnetic transmission according to the invention.

The diagrammatic structure of a magnetic transmission 118 is shown in an alternative sectional view in FIG. 8. The magnetic transmission 118 has the ring gear of the first gear stage 124, magnets 156 being arranged on the ring gear 124. The modulator of the first gear stage 126 is arranged in coaxial relationship adjoining the ring gear of the first gear stage 124. Magnets 156 are again arranged on the sun gear of the first gear stage 128. Modulation of the magnetic fields of the magnets 156 in conjunction with the modulator 126 provides for magnetic transmission between the drive side of the first gear stage (ring gear 124) and the driven side of the first gear stage (sun gear 128). The same similarly applies for the second gear stage formed from the ring gear 130, the modulator 132 and the sun gear 134.

LIST OF REFERENCES 100 wind turbine
102 tower
104 nacelle
106 rotor
108 rotor blades
110 spinner
112 rotor blade hub
114 axle journal
116 main bearing arrangement
118 magnetic transmission
120 generator
122 support
124 ring gear of the first gear stage
126 modulator of the first gear stage
128 sun gear of the first gear stage
130 ring gear of the second gear stage
132 modulator of the second gear stage
134 sun gear of the second gear stage
136 gear leg rotating
138 gear leg stationary
140 generator stator
142 generator rotor
144 bearing
146 generator shaft
148 coupling portion
150 magnetic transmission with integrated generator
152 stator winding
154 generator stator
156 magnets
218 magnetic transmission
220 generator
224 ring gear of the first gear stage
226 modulator of the first gear stage
228 sun gear of the first gear stage
230 ring gear of the second gear stage
232 modulator of the second gear stage
234 sun gear of the second gear stage
236 gear leg rotating
238 gear leg stationary
240 generator stator
242 generator rotor
244 bearing
246 generator shaft
248 coupling portion
318 magnetic transmission
320 generator
324 ring gear of the first gear stage
326 modulator of the first gear stage
328 sun gear of the first gear stage
330 ring gear of the second gear stage
332 modulator of the second gear stage
334 sun gear of the second gear stage
336 gear leg rotating
338 gear leg stationary
340 generator stator
342 generator rotor
344 bearing
346 generator shaft
348 coupling portion
418 magnetic transmission
420 generator
424 ring gear of the first gear stage
426 modulator of the first gear stage
428 sun gear of the first gear stage
430 ring gear of the second gear stage
432 modulator of the second gear stage
434 sun gear of the second gear stage
436 gear leg rotating
438 gear leg stationary
440 generator stator
442 generator rotor
444 bearing
448 coupling portion

The invention claimed is:

1. A wind turbine comprising:
a rotor blade hub,
a generator, and
a magnetic transmission coupled at a drive side to the rotor blade hub and at a driven side to the generator, wherein the magnetic transmission is a multi-stage magnetic transmission including a first gear stage comprising a ring gear, a modulator, and a sun gear, wherein the first gear stage of the magnetic transmission is either:
in the form of a stationary gear, wherein the ring gear is mounted rotatably and connected to the rotor blade hub, and wherein the modulator is stationary, or
in the form of a planetary gear, wherein the ring gear is stationary, and wherein the modulator is designed to be mounted rotatably and is connected to the rotor blade hub,
wherein a second gear stage of the multi-stage magnetic transmission comprises a ring gear, a sun gear, and a modulator,
wherein the second gear stage of the multi-stage magnetic transmission is in the form of a stationary gear, wherein the ring gear of the second gear stage is mounted rotatably and is connected to the sun gear of the first gear stage, and wherein the modulator of the second gear stage is stationary.

2. The wind turbine according to claim 1 wherein at least one of the multi-stage magnetic transmission or the generator is mounted to an axle journal by a main bearing or by two bearings.

3. The wind turbine according to claim 2 wherein the multi-stage magnetic transmission is supported by a support on the axle journal or on a machine carrier, wherein the support is configured to dampen forces acting on the axle journal or the machine carrier.

4. The wind turbine according to claim 3 wherein the support is configured to be adjustable and comprises at least one torque support configured to dampen forces acting thereon.

5. A wind turbine comprising:
a rotor blade hub,
a generator, and
a magnetic transmission coupled at a drive side to the rotor blade hub and at a driven side to the generator, wherein the magnetic transmission is a multi-stage magnetic transmission including a first gear stage and a second gear stage, wherein the first gear stage comprises a ring gear, a modulator, and a sun gear, wherein the first gear stage of the magnetic transmission is either:

in the form of a stationary gear, wherein the ring gear is mounted rotatably and connected to the rotor blade hub, and wherein the modulator is stationary, or in the form of a planetary gear, wherein the ring gear is stationary, and wherein the modulator is designed to be mounted rotatably and is connected to the rotor blade hub;

wherein the second gear stage of the multi-stage magnetic transmission is either:

in the form of a stationary gear, wherein a ring gear of the second gear stage is mounted rotatably and is connected to the sun gear of the first gear stage, and wherein a modulator of the second gear stage is stationary, or in the form of a planetary gear, wherein the ring gear of the second gear stage is stationary, and wherein the modulator of the second gear stage is mounted rotatably and is connected to the sun gear of the first gear stage.

6. The wind turbine according to claim 5 wherein the sun gear is mounted rotatably.

7. The wind turbine according to claim 5 wherein the second gear stage of the multi-stage magnetic transmission has a sun gear.

8. The wind turbine according to claim 7 wherein the generator has a rotor and a stator, wherein the rotor of the generator is connected to the sun gear of the second gear stage.

9. The wind turbine according to claim 7 wherein the sun gear of the second gear stage of the multi-stage magnetic transmission comprises a generator stator.

10. The wind turbine according to claim 9 wherein the generator stator comprises a winding.

11. The wind turbine according to claim 10 wherein the winding is a homopolar rotary field winding.

12. The wind turbine according to claim 9 wherein at least one of:

the generator stator is arranged adjacent to the modulator of the second gear stage, or the generator stator and the modulator of the second gear stage are arranged in mutually coaxial relationship.

13. The wind turbine according to claim 7 comprising an air gap, or wherein a magnetically non-conductive material is arranged between the modulator of at least one of the first or second gear stages and at least one of the ring gear or the sun gear of at least one of the first or second gear stages.

14. The wind turbine according to claim 5 wherein a gear chosen from the ring gear and the sun gear of a stage chosen from the first and second gear stages have magnets.

15. The wind turbine according to claim 5 wherein the ring gear, the sun gear, and the modulator of at least one of the first or second gear stages are arranged in mutually coaxial relationship.

16. The wind turbine according to claim 5 wherein at least one of:

a number of magnetic pole pairs of the sun gear of the first gear stage is unequal to a number of magnetic pole pairs of the sun gear of the second gear stage, or the number of the magnetic pole pairs of the sun gear of the first gear stage is not an integral multiple of the number of the magnetic pole pairs of the sun gear of the second gear stage.

17. The wind turbine according to claim 5 wherein at least one of:

a number of the magnetic pole pairs of the ring gear of the first gear stage is unequal to a number of magnetic pole pairs of the ring gear of the second gear stage, or the number of the magnetic pole pairs of the ring gear of the first gear stage is not an integral multiple of the number of the magnetic pole pairs of the ring gear of the second gear stage.

18. The wind turbine according to claim 5 wherein at least one of:

a number of the magnetic pole pairs of the ring gear of the first and/or second gear stages is unequal to a number of the magnetic pole pairs of the sun gear of at least one of the first or second gear stages, or the number of the magnetic pole pairs of the ring gear of at least one of the first or second gear stages is not an integral multiple of the number of the magnetic pole pairs of the sun gear of at least one of first or second gear stages.

* * * * *